INVENTORS
THOMAS J. LEE, LAWRENCE M. PATRICK
& ALFRED W. SCHULTZ
BY
Barnes, Kisselle, Raisch & Choate
ATTORNEYS INVENTORS
THOMAS J. LEE, LAWRENCE M. PATRICK
& ALFRED W. SCHULTZ.
BY
Barnes, Kisselle, Raisch & Choate
ATTORNEYS

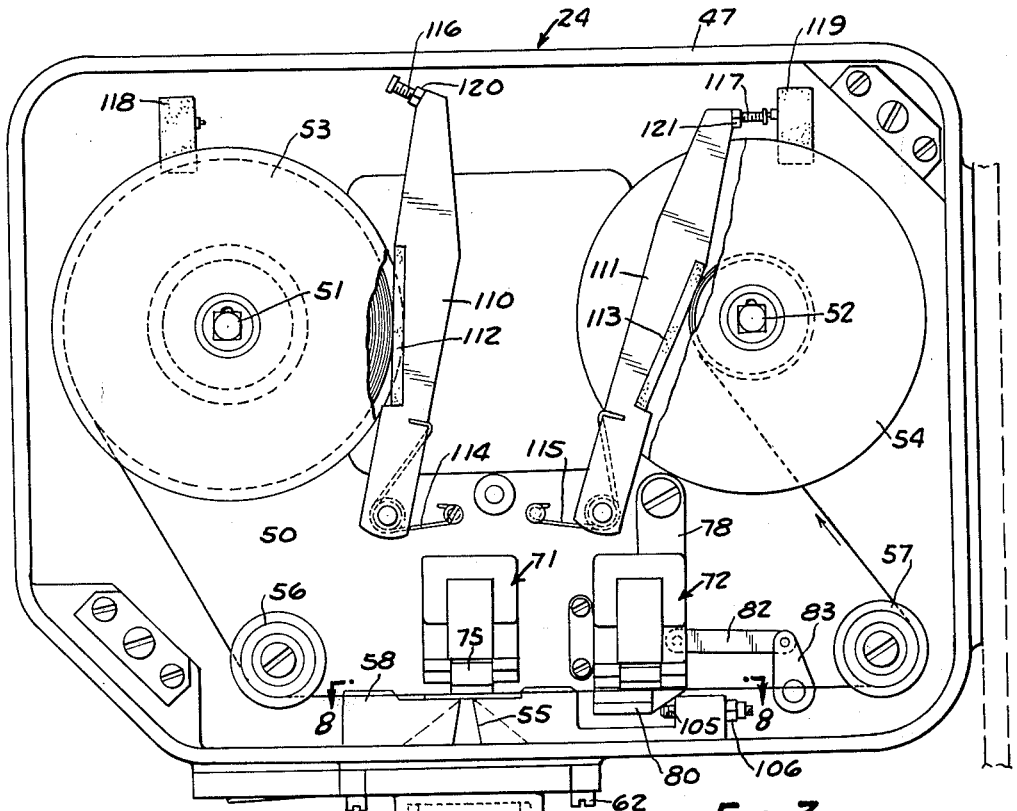
FIG. 3.
FIG. 4.
INVENTORS
THOMAS J. LEE, LAWRENCE M. PATRICK
& ALFRED W. SCHULTZ
BY
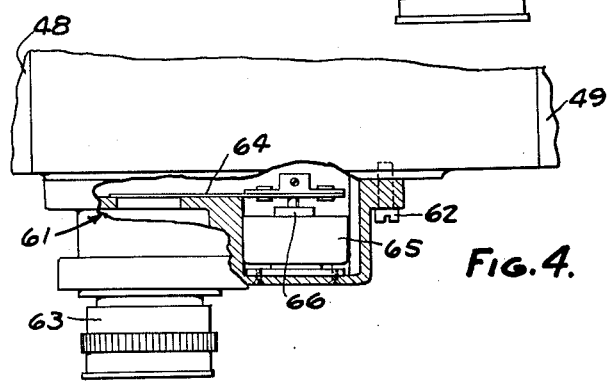
ATTORNEYS Feb. 26, 1963 T. J. LEE ET AL 3,078,775
CAMERA APPARATUS Filed Dec. 30, 1957 5 Sheets-Sheet 4

United States Patent Office 3,078,775
Patented Feb. 26, 1963

3,078,775
CAMERA APPARATUS
Thomas J. Lee, Livonia, Lawrence M. Patrick, Detroit, and Alfred W. Schultz, East Detroit, Mich., assignors to R. L. Polk & Co., Detroit, Mich., a corporation of Delaware
Filed Dec. 30, 1957, Ser. No. 705,853
14 Claims. (Cl. 95—34)

This invention relates to camera apparatus and particularly to camera apparatus for recording a multiplicity of names and addresses on film.

The camera apparatus of this invention is intended to be used as a part of an addressing system wherein a plurality of names and addresses are recorded in succession on a roll of film. The film is then developed and the developed images corresponding to the names and addresses are printed photographically onto a roll of paper. The individual names and addresses are cut from the developed roll of paper and are adhered to envelopes or other pieces of advertising literature.

It is an object of this invention to improve upon camera apparatus presently employed in addressing systems of the type described. The improvements embodied in the camera apparatus of the present invention include, among others: a novel means for advancing the film in the camera accurately predetermined small increments so that a relatively great number of names and addresses may be recorded on a short length of film; a means for positively gripping and moving the film across the lens aperture between exposures, as distinguished from pulling the film across the lens aperture by friction rollers; an electrically controlled camera wherein the complete cycle of operating the shutter and feeding the film is initiated by actuating a single switch conveniently located on the copy holding easel.

Other objects and advantages of the invention will be apparent from the following description and drawings in which:

FIG. 3 is a right side elevational view on an enlarged scale of the camera shown in the camera apparatus in FIG. 1, with the side cover removed.

FIG. 4 is a fragmentary front elevational view of the camera, parts being shown in section.

Figure 1:
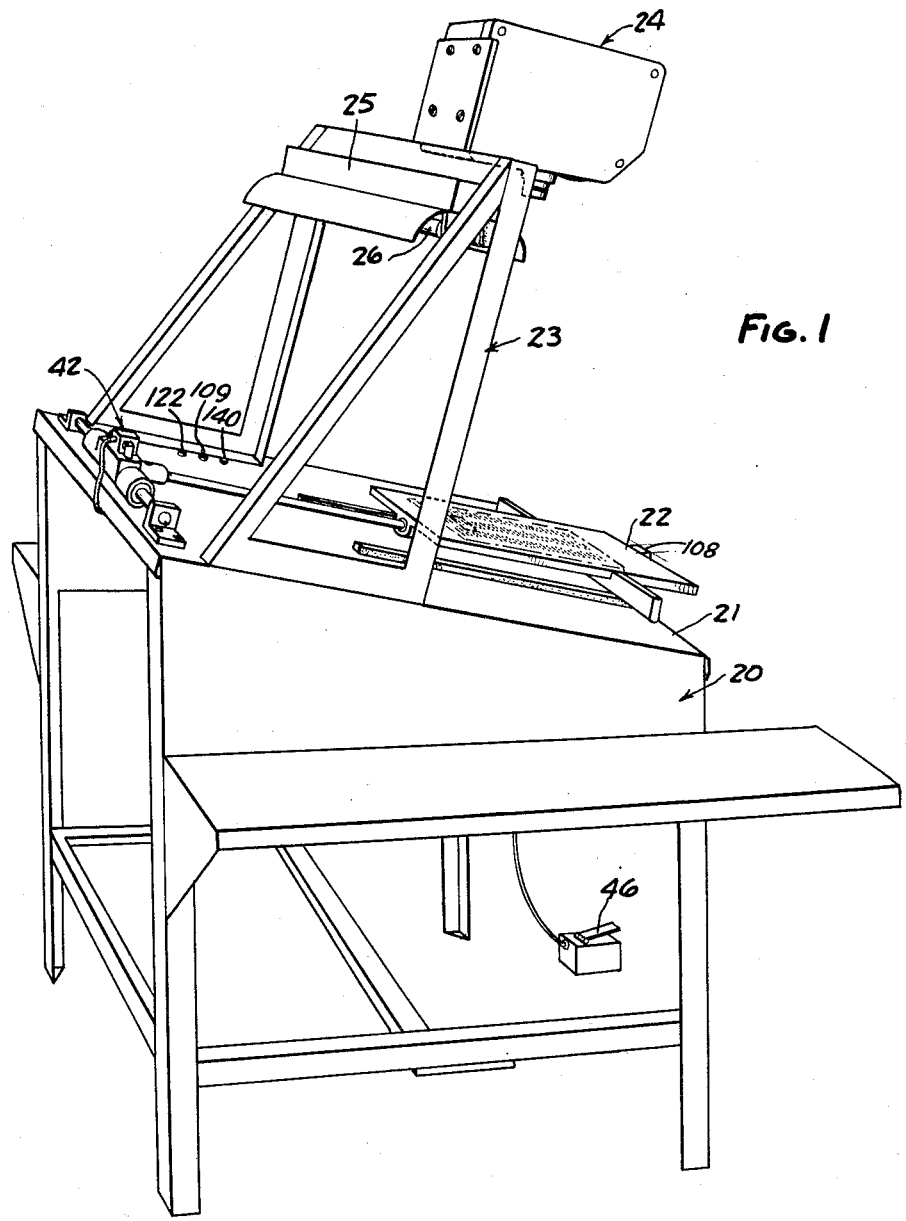
FIG. 1 is a perspective view of the camera apparatus embodying the invention.

Referring to FIG. 1, the camera apparatus comprises a frame 20 which supports a flat inclined table 21. The table 21 is inclined upwardly and rearwardly away from the operator who is normally seated on the right of the apparatus as it is shown in FIG. 1. An easel 22 made of light-colored plastic material for supporting a list of names and addresses or other items to be photographed is mounted on table 21 for movement longitudinally and laterally thereof. An auxiliary frame 23 supports a camera 24 in position above table 21. Auxiliary frame 23 also supports an illuminating device 25 including fluorescent tubes 26 which illuminate the surface of the table 21.

In order to make it easier for the operator to manipulate the easel 22 when it is desired to photograph successive names and addresses from a list that extends vertically of the copy sheet, a brake 42 is provided to selectively lock the easel 22 against movement laterally of the table 21. The operation of the brake 42 is controlled by a foot-operated switch 46 (FIG. 1).

Figure 5:
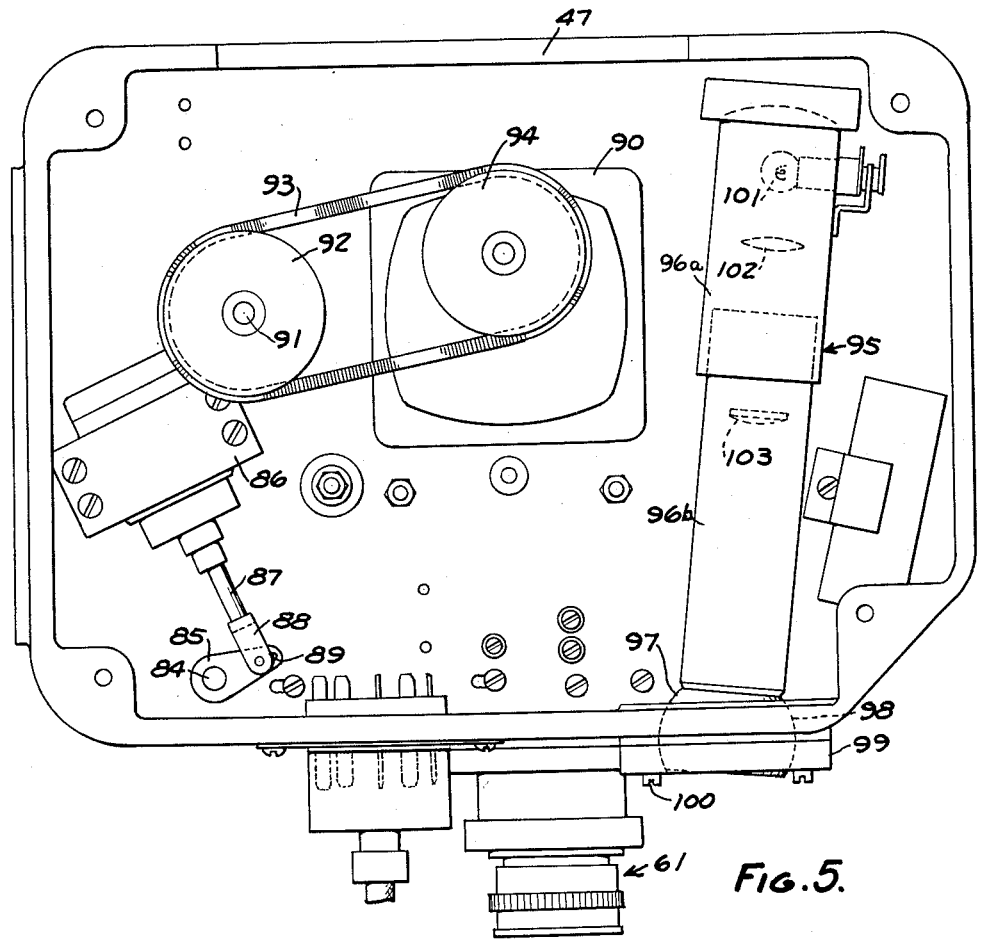
FIG. 5 is a left side elevational view on an enlarged scale of the camera shown in FIG. 1, with the side cover removed.
Figure 6:
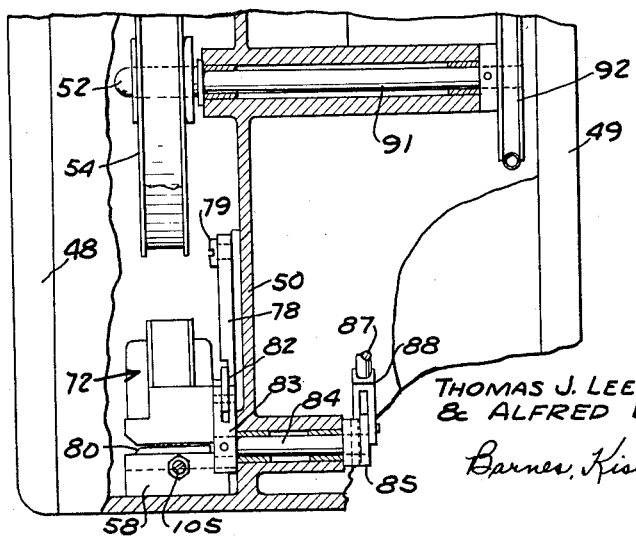
FIG. 6 is a fragmentary rear elevational view of the camera, parts being shown in section.

Referring to FIGS. 3, 5 and 6, the camera 24 comprises a housing 47 having removable side covers 48, 49 and an integral central wall 50 parallel to the covers 48, 49.

As shown in FIG. 3 a pair of film spool supports 51, 52 are rotatably mounted in central wall 50. Film spool support 51 supports a film supply spool 53 and film spool support 52 supports a film take-up spool 54. The film passing from spool 53 to spool 54 is guided over an aperture 55 by idler rolls 56, 57 rotatably mounted on central wall 50.

Figure 7:
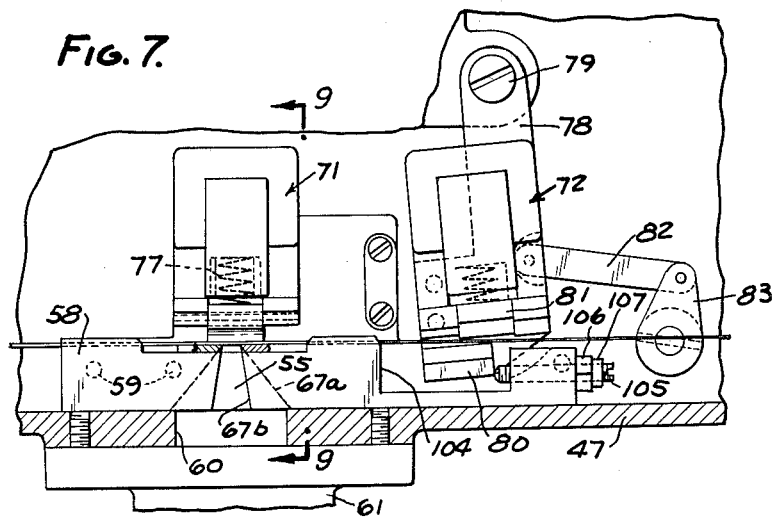
FIG. 7 is an enlarged fragmentary view of a portion of the camera shown in FIG. 3, parts being shown in a different position.

Referring to FIGS. 3, 7, 8 and 9, the aperture 55 is defined by an opening in an aperture plate 58 which is fixed to the central wall 50 by screws 59. The aperture 55 overlies an opening 60 in the bottom of the camera housing 47 (FIG. 7). A lens assembly 61 is mounted on the underside of the camera by means of screws 62 and includes a lens 63 underlying the opening 60. The lens assembly 61 also includes a shutter 64 fixed on the shaft of a rotary type solenoid 65. The shutter 64 is normally positioned over the lens and is rotated out of its overlying position by energization of solenoid 65. The shutter is returned to its normal position after the solenoid 65 is deenergized by a clock spring 66.

Figure 8:
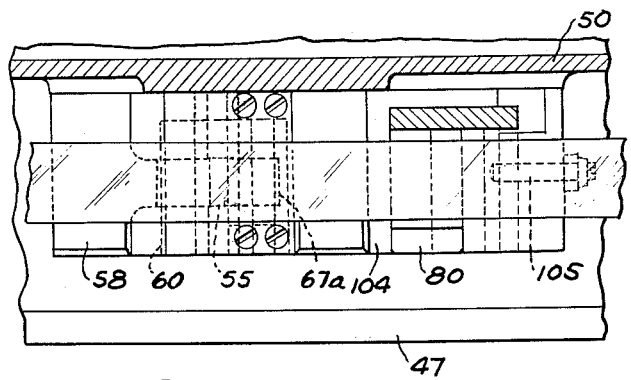
FIG. 8 is a sectional view on an enlarged scale taken along the line 8—8 in FIG. 3.

As shown in FIGS. 3, 7 and 8, the aperture 55 is formed by an opening in the plate 58 with the sides of the opening diverging away from the film. The portions 67a of the sides of the opening which underlie the film diverge at a greater angle than the portions 67b which do not underlie the film so that the aperture is wider at its end nearest the lens and underlying the film than the opening 60 in the camera housing. This prevents objectionable shadows from being cast onto the portion of the film which overlies the aperture.

The mechanism for holding and moving the film in successive increments includes a stationary magnet assembly 71 which operates to hold the film against the aperture plate 58 and a movable magnet assembly 72 which operates to grip and move the film toward the roller 57 and, in turn, toward the take-up spool 54.

Figure 9:
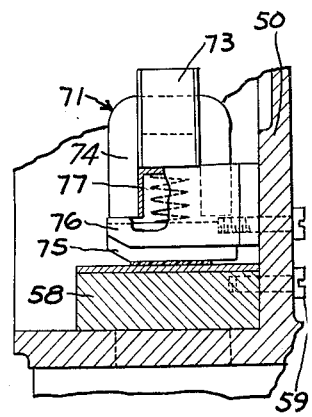
FIG. 9 is a fragmentary sectional view taken along the line 9—9 in FIG. 7.
Figure 10:
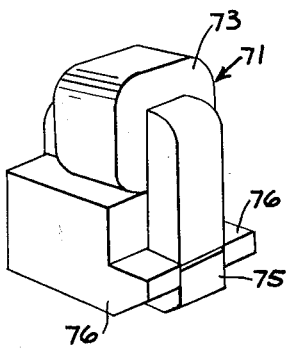
FIG. 10 is a perspective view of one of the magnet assemblies used in the camera.

Referring to FIG. 10, the fixed magnet assembly 71 includes an electromagnet 73 and a movable armature 75 which is guided between spaced jaws 76 of nonmagnetic material. The movable armature 75 is yieldingly urged away from the fixed armature 74 by a coil spring 77 (FIG. 9).

The movable armature member 75 is thus normally yieldingly urged toward the aperture plate 58 to grip the film. When the magnet 73 is energized the movable armature 75 is moved away from the aperture plate 58 to release the film.

The construction of magnet assembly 72 is identical to that of the magnet assembly 71. Magnet assembly 72 is mounted on a lever 78 which is pivoted to the central wall 50 by means of a bolt 79 (FIG. 6). A shoe 80 on the lower end of the lever 78 projects beneath the movable armature member 81 of the magnet assembly 72. When the magnet of the magnet assembly 72 is deenergized, the film is gripped between the armature member 81 and the shoe 80. If the lever 78 is swung or pivoted when the film is gripped, the film is moved.

Referring to FIGS. 3 and 7, the means for swinging the lever 78 and, in turn, the magnet assembly 72 includes a link 82 one end of which is pivoted to lever 78 and the other end of which is pivoted to the bifurcated end of a bell crank 83 fixed on one end of a shaft 84 journalled in the wall 50. A second bell crank 85 is fixed on the other end of the shaft 84 (FIGS. 5 and 6).

A solenoid 86 is mounted on the central wall 50 on the same side as the bell crank 85. The plunger 87 of the solenoid is normally urged downwardly as shown in FIG. 5 by a spring (not shown). The end of the plunger 87 is formed with a bifurcated yoke 88 which supports a pin extending through an elongated slot 89 in the end of the bell crank 85. When the solenoid 86 is energized the bell crank 85 is moved to rotate the shaft 84, moving the bell crank 83 and pivoting the lever 78 through the link 82. By this movement the magnet assembly 72 is moved to the right with reference to FIGS. 3 and 7. The provision of the elongated slot 89 prevents the jamming which would normally occur if the linear movement of the plunger 87 were used to cause an arcuate movement of the bell crank 85 (FIG. 5).

As shown in FIG. 5 an electric motor 90 is mounted on the central wall 50 on the same side as solenoid 86. The shaft 91 of the second film support 52 extends through the central wall 50 and a pulley 92 is fixed to the end thereof. An endless belt 93 fashioned as an endless spiral coil is trained over pulley 92 and a pulley 94 on the shaft of the electric motor 90, thus tending to continuously rotate the take-up spool 54 in a direction causing the film to be wound up. By this construction, when the movable magnet assembly 72 is shifted to the right with reference to FIGS. 3 and 7, the film which is thereby moved is immediately wound on the spool 54. When the film is wound on the take-up spool 54, slippage of the endless coil belt 93 occurs.

Referring to FIG. 7, a portion of the aperture plate 58 is cut away as at 104 to permit the free swinging movement of the shoe 80 on the lever 78. A screw 105 threaded in plate 58 extends into the space 104 to serve as an adjustable abutment for limiting the movement of the lever 78, and, in turn, the magnet assembly 72 in the direction toward the take-up spool 54 to control the amount of film that is moved past aperture 55 in any one movement of the lever 78. A nut 106 is threaded on the screw and a lock nut 107 locks the screw in position.

As shown in FIG. 5 a target light assembly 95 is mounted in the camera housing 47 on the same side as the solenoid 86 and the electric motor 90. Target light assembly 95 includes telescoping tubes 96a, 96b. The lower end of tube 96b is formed with a spherical surface 97 and is supported in a socket 98 in the bottom of the housing 47. The position of the tubes 96a, 96b angularly relative to the socket 98 is fixed by a plate 99 fastened to the bottom of the housing by screws 100.

The target assembly 95 also includes a source of light such as a small light bulb 101, a target disc 102 having an aperture and a lens 103, whereby a spot of light of predetermined configuration is projected downwardly toward the table 21 of the camera apparatus. The size of the spot of light is adjusted by telescoping tube 96a relative to tube 96b so that the spot of light indicates exactly the field of the camera and the area which will be photographed. In photographing a list of names and addresses the configuration of the aperture in disc 102 is rectangular so that the spot of light is rectangular.

A button type control switch 108 (FIG. 1) is mounted on the easel 22 and is movable therewith. When the switch 108 is depressed the shutter is operated to expose the film and energize the magnet assemblies 71, 72 and solenoid 86 in the proper order to cause the film to be advanced by a predetermined increment.

A master switch 109 (FIG. 1) is provided on the table 21 to provide power to the various electrically actuated components of the camera apparatus.

Means are provided for indicating to the operator that the film supply on the film supply spool 53 is low or that the leader has been fully wound on the take-up spool 54. These means are shown in FIG. 3 and include arms 110, 111 pivoted at one end to the wall 50 and provided with projections 112, 113 which bear against the outermost convolution of the film on each of the respective spools 53, 54. The arms are yieldingly urged toward the center of the spools by light torsion springs 114, 115 each of which has one end thereof fastened to the wall 50 and the other end thereof acting on its respective arm.

Screws 116, 117 are threaded on the free ends of the arms 110, 111. Normally closed microswitches 118, 119 are fixed to the wall 50 in such a position that when the film on the supply spool 53 is low or the film on the take-up spool 54 has not been wound on the spool at least a predetermined amount, the switches 118, 119 are actuated by the screws 116, 117 on the ends of the arms 110, 111, respectively. By threading the screws 116, 117 into or out of the ends of the arms, the film indicating means may be adjusted. Lock nuts 120, 121 serve to hold the screws in any adjusted position. When either of the switches 118, 119 is actuated a light 122 on table 21 is deenergized to signal the operator (FIG. 1).

Figure 2:
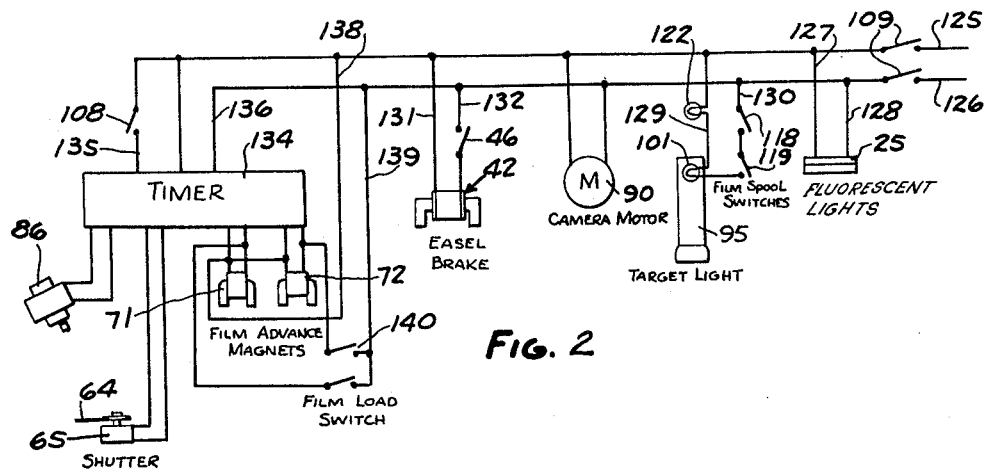
FIG. 2 is a diagrammatic wiring diagram of the camera apparatus.

FIG. 2 is a diagrammatic wiring diagram of a circuit for controlling the operation of the camera apparatus. Power from a source of current is supplied through main power lines 125, 126. When the master switch 109 on the table 21 is closed, current is supplied through lines 127, 128 to the light fixture 25 in order to illuminate the surface of the table 21.

In addition, current is supplied through lines 129, 130 to the bulb 101 of the target assembly 95, thereby projecting the target onto the easel 22. Normally closed switches 118, 119 and the signal light 122 of the low-film indicating means are connected in series with the bulb 101 so that the signal light 122 is also energized. When switch 118 is opened due to low film supply on supply spool 53 or when switch 119 is opened because the proper length of leader is not wound on the film take-up spool 54, the target light 101 and the signal light 122 are deenergized so that the operator has two signals of these conditions.

Closing of the master switch 109 also supplies current to the motor 90 causing it to run continuously. In addition, current is supplied to the lines 131, 132 leading to the easel brake 42 so that when the foot switch 46 is depressed current is supplied to the easel brake 42 locking the easel 22 against movement laterally of the table 21.

The closing of the switch 109 also supplies current to the timer 134 through lines 135, 136. When the button switch 108 in line 135 on the easel 22 is depressed, the cycle of operations is initiated by the timer 134 to first energize solenoid 65 to open the shutter, and thereafter energize and deenergize the magnet assemblies 71, 72 and the solenoid 86 in the proper order to cause an increment of film to be advanced over the aperture.

This cycle of operations includes first energizing the magnet of magnet assembly 71, thereafter energizing solenoid 86 to swing the second magnet assembly 72 which is gripping the film toward the film take-up spool 54, then deenergizing the magnet of magnet assembly 71 to cause the film to be gripped over the aperture, energizing the magnet of magnet assembly 72, deenergizing solenoid 86 to return the magnet assembly 72 to its original position, and finally deenergizing the magnet of magnet assembly 72 to cause the magnet assembly to grip the film.

Provision is made for energizing the magnet assemblies 71, 72 in order to permit the threading of the film or the removal of the film when changing spools of film. Lines 138, 139 in FIG. 2 provide current through a double pole switch 140 to the magnet assemblies 71, 72 so that, by closing the switch 140, the magnet assemblies are energized to elevate the armatures 75, 80 and release the film. The switch 140 is mounted on the table 21 (FIG. 1) and is preferably of the push-button type.

In use the operator places a sheet of paper having vertically extending columns of names and addresses, preferably typewritten, thereon on the easel 22. The master switch 109 is then operated. If sufficient film is on the film supply spool 51 and sufficient film leader has been wound on the film take-up spool 54, the signal light 122 will be illuminated and the target light 101 will project a spot of light onto the easel 22. The operator then moves the easel to bring the desired column of names and addresses into alignment with the spot of light projected by the target light 101. The operator then depresses the foot switch 46 to energize the easel brake 42 and lock the easel 22 against movement laterally of the table 21. The easel 22 may then be moved along the second shaft 33 and longitudinally of the table 21 to bring any of the names in the column into the area of the projected spot of light. As each desired name is brought into the area of the light the operator depresses the button switch 108 conveniently located on the easel, causing the camera to operate, that is, opening and closing the shutter and thereafter advancing the film to bring an unexposed area of film above the aperture 55.

After photographing the names and addresses in one column, the operator releases the foot switch 46 and moves the easel laterally of the table 21 to bring another column on the copy sheet into proper alignment. The foot switch 46 is then again depressed and the easel 22 is moved to successively bring the names and addresses into the area of the target light spot for photographing.

When the film supply on the film supply spool 51 becomes low, the signal light 122 and the target light 101 will be extinguished indicating to the operator that the film supply is low.

When the operator wishes to remove the exposed film and provide a fresh spool of unexposed film, the operator depresses and holds down the switch 140 to energize the magnet assemblies 71, 72 thereby releasing the film gripped by the magnet assemblies and permitting the unexposed film to be threaded in the camera. The film is then threaded under the magnet assemblies and the operator releases the switch to deenergize the magnet assemblies.

We claim:

1. In a camera, the combination comprising a housing, a film supply spool and a film take-up spool in said housing, said housing having means defining an aperture, means for guiding film from said supply spool to said take-up spool across said aperture, means for continuously tending to rotate said take-up spool to keep the film wound thereon, means for selectively applying a clamping force on the film on said means defining the aperture to grip the film at said aperture and hold it in fixed position over said aperture, means between said aperture and one of said spools for selectively gripping opposed faces of a portion of the film and moving said portion of the film bodily in a direction toward said take-up spool and means selectively operating said first and second gripping means such that at least one of said gripping means is alway in engagement with said film.

2. The combination set forth in claim 1 wherein said means for selectively operating said first and second gripping means is operable to first engage said first gripping means, thereafter engage said second gripping means and release said first gripping means, move said second gripping means toward said take-up spool, engage said first gripping means, release said second gripping means and return said second gripping means to its original position, whereby said film is moved by increments across said aperture, said take-up spool winding up each increment of film as it is moved toward the take-up spool.

3. The combination set forth in claim 2 including means for simultaneously releasing said first and second gripping means to permit the threading of a length of film between said gripping means.

4. In a camera, the combination comprising a housing, a film supply spool and a film take-up spool in said housing, said housing having an aperture, means for guiding film from said supply spool to said take-up spool across said aperture, means for continuously tending to rotate said take-up spool to keep the film wound thereon, means for selectively applying a clamping force on a face of the film in the area of the aperture to grip the film and hold it in fixed position over said aperture, means between said aperture and one of said spools for selectively gripping a face portion of the film and moving said portion of the film bodily in a direction toward said take-up spool, said second gripping means comprising an electromagnet, means for moving said electromagnet toward and away from said take-up spool, said electromagnet including a movable armature, an anvil movable with said electromagnet, and means for yieldingly urging said armature toward said anvil to grip a face portion of said film, said armature being movable away from said anvil when the electromagnet is energized to release the film.

5. The combination set forth in claim 4 wherein the means for mounting said magnet for movement toward and away from said take-up spool comprise a lever pivoted to said camera housing, said armature and anvil being mounted on said lever, and said moving means comprise a solenoid operatively connected to said lever for periodically pivoting said lever to move said magnet toward and away from said take-up spool.

6. In a camera, the combination comprising a housing, a film supply spool and a film take-up spool in said housing, said housing having an aperture, means for guiding said film from said supply spool to said take-up spool across said aperture, means for continuously tending to rotate said take-up spool to keep the film wound thereon, a lever pivoted to said camera housing, means mounted on said lever and movable therewith for selectively gripping a face portion of the film and moving said portion of the film bodily toward the take-up spool, means for swinging said lever toward and away from said take-up spool, and means for selectively clamping and holding the film in fixed position against said aperture, said last-mentioned means comprising an electromagnet, a movable armature, and means for yieldingly urging said armature toward a face of said film, whereby when said electromagnet is energized said armature is moved against said yielding means and away from said film, said gripping means on said lever comprising an electromagnet fixed to said lever, an anvil on said lever, said electromagnet including a movable armature, and means for yieldingly urging said armature toward said anvil to grip said film, said armature being movable away from said anvil when the electromagnet is energized.

7. The combination set forth in claim 6 including timing means for energizing said electromagnets and actuating said swinging means in the following sequence: energize the electromagnet of said clamping and holding means, move said second gripping means toward said take-up spool, deenergize the electromagnet of said clamping and holding means, energize the electromagnet of said gripping means, return said gripping means to its original position, and deenergize the electromagnet thereof, whereby said film is moved by increments across said aperture, said take-up spool winding up each increment of film as it is moved toward the take-up spool.

8. In a camera, the combination comprising a housing having a centrally located wall, a first film spool rotatably mounted on one side of said wall, a second film spool rotatably mounted on the same side of said wall as said first film spool, said housing having means defining an aperture therein, means for guiding film from said first film spool to said second film spool across said aperture, means mounted on said housing on the same side thereof as said film spools for selectively applying a force to the means of defining the aperture to grip the film therebetween and hold it in fixed position over said aperture, a lever pivoted to said wall on the same side of the wall as the film spools, means mounted on said lever and movable therewith for gripping opposed face portions of the film, means mounted on the other side of said wall and operatively connected to said lever for swinging said lever, and means on the same side of said wall as said latter means and operatively connected to said second film spool to tend to rotate said second film spool and keep the film wound thereon.

9. In a camera, the combination comprising a housing having a centrally located wall, a first film spool rotatably mounted on one side of said wall, a second film spool rotatably mounted on the same side of said wall as said first film spool, said housing having an aperture therein, means for guiding film from said first film spool to said second film spool across said aperture, means mounted on said housing on the same side thereof as said film spools for selectively applying a force to a face of the film in the area of the aperture to grip the film and hold it in fixed position over said aperture, a lever pivoted to said wall on the same side of the wall as the film spools, means mounted on said lever and movable therewith for gripping a face portion of the film, means mounted on the other side of said wall and operatively connected to said lever for swinging said lever, and means on the same side of said wall as said latter means and operatively connected to said second film spool to tend to rotate said second film spool and keep the film wound thereon, said means mounted on the other side of said wall for swinging said lever comprising a reciprocating motor, a shaft journalled in and extending through said wall, a bell crank mounted on one end of said shaft, said motor being connected to said bell crank, a second bell crank on the other end of said shaft, and a link extending between said second bell crank and said lever.

10. The combination set forth in claim 9 wherein said first bell crank is provided with an elongated slot, said reciprocating motor having a plunger formed with a pin thereon extending through said slot and operatively connecting said motor said first bell crank.

11. In a camera, the combination comprising a housing having a centrally located wall, a first film spool rotatably mounted on one side of said wall, a second film spool rotatably mounted on the same side of said wall as said first film spool, said housing having an aperture therein, means for guiding film from said first film spool to said second film spool across said aperture, a first electromagnet assembly mounted on said central wall on the same side as said film spools, said assembly including a movable armature, and means for yieldingly urging said armature against a face of said film in the area of the aperture for clamping said film in fixed position over the aperture, a lever pivoted to said camera wall on the same side as said first magnet assembly, an anvil on said lever, a second electromagnet assembly mounted on said lever and including a movable armature, means for yieldingly urging said armature gainst said anvil to grip a face portion of the film between said armature and said anvil, means for swinging said lever toward and away from said second film spool comprising a solenoid mounted on the other side of said central wall, means for operatively connecting said solenoid to said lever, and means mounted on the same side of said central wall as said solenoid and operatively connected to said second film spool for tending to rotate said second film spool to keep the film thereon wound tightly.

12. The cmbination set forth in claim 11 including means for successively energizing said electromagnet assemblies and said solenoid to first energize said first electromagnet assembly, thereafter energize said solenoid to shift said lever toward said second film spool, deenergize said first electromagnet assembly and energize said second electromagnet assembly, deenergize said solenoid to return said lever and second electromagnet assembly to its original position, and finally deenergize said second electromagnet assembly, thereby moving said film in predetermined increments across said aperture, said second film spool winding up each increment of film as it is fed toward said second spool.

13. In a camera, the combination comprising a housing, a film supply spool and a film take-up spool in said housing, said housing having an aperture, means for guiding film from said supply spool to said take-up spool across said aperture, means for continuously tending to rotate said take-up spool to keep the film wound thereon, means for selectively applying a clamping force on a face of the film in the area of the aperture to grip the film and hold it in fixed position over said aperture, means between said aperture and one of said spools for selectively gripping a face portion of the film and moving said portion of the film bodily in a direction toward said take-up spool, said first gripping means comprising an electromagnet, a movable armature, and means for yieldingly urging said armature toward a face of said film, whereby when said electromagnet is energized said armature is moved against said yielding means and away from said film.

14. In a camera, the combination comprising a housing having a centrally located wall, a first film spool rotatably mounted on one side of said wall, a second film spool rotatably mounted on the same side of said wall as said first film spool, said housing having an aperture therein, means for guiding film from said first film spool to said second film spool across said aperture, means mounted on said housing on the same side thereof as said film spools for selectively applying a force to a face of the film in the area of the aperture to grip the film and hold it in fixed position over said aperture, a lever pivoted to said wall on the same side of the wall as the film spools, means mounted on said lever and movable therewith for gripping a face portion of the film, means mounted on the other side of said wall and operatively connected to said lever for swinging said lever, and means on the same side of said wall as said latter means and operatively connected to said second film spool to tend to rotate said second film spool and keep the film wound thereon, said means tending to rotate the second film spool comprising a continuously operating motor, and endless coil means operatively connecting said motor to said second film spool.

References Cited in the file of this patent
UNITED STATES PATENTS

| 1,309,471 | Evans | July 8, 1919 |
| 1,959,922 | Maspons | May 22, 1934 |
| 2,232,240 | Jones | Feb. 18, 1941 |
| 2,536,156 | Brownscombe | Jan. 2, 1951 |
| 2,630,743 | O'Kane | Mar. 10, 1953 |
| 2,642,773 | Briechle | June 23, 1953 |
| 2,741,154 | Ludwig | Apr. 10, 1956 |
| 2,772,325 | Gaite | Nov. 27, 1956 |
| 2,795,174 | Salje | June 11, 1957 |
| 2,834,832 | Somers | May 13, 1958 |

UNITED STATES PATENT OFFICE
CERTIFICATE OF CORRECTION

Patent No. 3,078,775 February 26, 1963

Thomas J. Lee et al.

It is hereby certified that error appears in the above numbered patent requiring correction and that the said Letters Patent should read as corrected below.

Column 6, line 73, after "means" strike out "of"; column 7, line 56, for "gainst" read -- against --; line 66, for "cmbination" read -- combination --.

Signed and sealed this 24th day of September 1963.

(SEAL)
Attest:

ERNEST W. SWIDER
Attesting Officer

DAVID L. LADD
Commissioner of Patents